(12) United States Patent
Shappir et al.

(10) Patent No.: US 7,657,837 B2
(45) Date of Patent: Feb. 2, 2010

(54) SEAMLESS WINDOWS FUNCTIONALITY TO REMOTE DESKTOP SESSIONS REGARDING Z-ORDER

(75) Inventors: Dan Shappir, Tel Aviv (IL); Eran Heyman, Closter, NJ (US); Dror Shilo, Jerusalem (IL)

(73) Assignee: Ericom Software Ltd., Jerusalem (IL)

( * ) Notice: Subject to any disclaimer, the term of this patent is extended or adjusted under 35 U.S.C. 154(b) by 275 days.

(21) Appl. No.: 11/398,554

(22) Filed: Apr. 6, 2006

(65) Prior Publication Data

US 2006/0230156 A1    Oct. 12, 2006

Related U.S. Application Data

(60) Provisional application No. 60/668,589, filed on Apr. 6, 2005.

(51) Int. Cl.
  *G06F 3/00*   (2006.01)
  *G06F 9/00*   (2006.01)
  *G06F 17/00*  (2006.01)

(52) U.S. Cl. .................. 715/751; 715/797; 715/766; 715/790; 715/794

(58) Field of Classification Search .............. 715/751, 715/766, 790, 794, 797
See application file for complete search history.

(56) References Cited

U.S. PATENT DOCUMENTS

| | | | | | |
|---|---|---|---|---|---|
| 5,649,173 | A | * | 7/1997 | Lentz | 345/501 |
| 7,146,573 | B2 | * | 12/2006 | Brown et al. | 715/802 |
| 2004/0199922 | A1 | * | 10/2004 | Krutsch et al. | 719/310 |

* cited by examiner

*Primary Examiner*—Kieu Vu
*Assistant Examiner*—Sabrina L. Greene
(74) *Attorney, Agent, or Firm*—Mark M. Friedman

(57) ABSTRACT

In a client-server system, a server-node application runs a user session and a remote presentation protocol communicates between the client node and the server node. The server node stores a remote virtual desktop including remote windows of the user session. The client node displays multiple local windows of applications running locally on the client node and further displays one or more windows of the remote virtual desktop. The one or more windows are clipped to produce a clipped region so that the remote windows are displayed therein to appear as the local windows. The local windows are enumerated according to z-order from back to front and an area of each local window which overlaps the clipped region is subtracted from the clipped region so that the local windows show through the area.

14 Claims, 4 Drawing Sheets

SEAMLESS WINDOWS FUNCTIONALITY TO REMOTE DESKTOP SESSIONS REGARDING Z-ORDER

CROSS REFERENCE TO RELATED APPLICATIONS

This application claims the benefit from US provisional application 60/668,589 filed 6 Apr. 2005 by the present inventors.

FIELD AND BACKGROUND OF THE INVENTION

The present invention relates to client-server computer networks. More specifically, the invention relates to a system and method for providing an integrated view of local and remote windows within a single desktop.

Recent years have seen a resurgence of server-based computing as a preferred model for application deployment, access and use. In server-based computing, applications are installed on a central server or multiple central servers and accessed from client nodes that provide only the display and user input functionality. The benefits of server-based computing include simplified application deployment and updates, the ability to use cheaper client devices, and improved security. The three main components that make up a server-based computing environment are:

1. One or more servers running a multi-user operating system.
2. A remote presentation protocol
3. Client software and device Microsoft Windows has been traditionally a client-oriented platform, with applications running directly on the client-node, and having only a limited use of central resources, such as printers and file servers. The introduction of Microsoft Terminal Server as an effective implementation of a Windows-compatible multi-user operating system, coupled with introduction of remote presentation protocols, such as Microsoft Remote Desktop Protocol (RDP), have made server-based computing a viable solution. FIG. 1 illustrates in a prior art client-server network a terminal server (110) in communication with clients (140) using a protocol (130) such as RDP. Terminal Server (110) creates multiple virtual desktops (120), one per each user session. RDP transmits an image of virtual desk-tops (120) to be displayed by the client software on clients (140) and transmits user inputs, such as keyboard or mouse inputs, back from clients (140) to virtual desktops (120) on server (110). Typically, clients (140) are provided with a representation of the entire virtual desktop (120) for the specific session, as a single unit.

Because of the client-oriented tendencies and capabilities of modern operating systems, such as Windows itself, a mixed-model, or hybrid operation, is often desired rather than a pure server-based computing model. In such a mixed-model some applications are run remotely on the server and other applications are run locally on the client. Benefits of this model include reduced load on the servers, reduced network traffic and the ability to use some applications when off line (i.e. disconnected from the server). In order for such a model to be truly effective, the client software must be able to integrate windows of applications running on the server seamlessly into the client's desktop. Otherwise the client user will quickly become disoriented and frustrated from trying to navigate between applications running on the client's desktop and on a separate server desktop.

Another advantage of integrating the windows of the remote desktop into the client's desktop is in a scenario where a single client node is connected to multiple servers. Instead of server applications running in separate desktops, one per each server, they are all unified in the single local desktop, resulting in improved usability for the user.

The ability to integrate windows of applications running on the server into the client's desktop is known as "seamless windows". Server applications accessed using the seamless windows mechanism emulate the behavior of local windows, creating a consistent look and feel for the user.

Some remote presentation protocols, such as existing versions of RDP, are limited to transmitting a representation of the entire remote desk-top as a single unit, rather than each window separately.

Referring now to FIG. 2 (prior art), on client node (140), remote virtual desktop (120) is represented by a single local window (230) including windows (240) of the remote applications. Single local window (230) including remote application windows (240), is rendered as an image of virtual remote desktop (120) and overlays windows (220) of local applications on a local desktop (210). In order to create the seamless windows experience using protocols such as RDP, client (140) needs to clip windows (220) along boundaries of local window (230). To be able to perform this clipping, client (140) requires additional information to be transmitted from server (110), information that may not be a standard part of the protocol. Transmitting the additional, required information is performed by installing a component on server (110) that gathers the information and transmits it to client (140).

For the RDP protocol, various extensions exist that provide different levels of seamless windows functionality. The differences between the levels relate with how closely windows (230) of remote applications emulate the behavior of windows (220) belonging to local applications, and how integrated and consistent is the behavior of local desktop (210) on which both types of windows (220 and 230) are displayed. Most implementations strive to emulate behavior of local windows (220) as closely as possible, otherwise inconsistencies between local windows (220) and remote windows (230) break the illusion of a single unified desktop, resulting in usability degradation rather than improvement.

Existing RDP protocol extensions clip the presentation of the remote desktop using only the boundaries of the remote windows. Such a method disregards the area, position and z-order of local windows. As a result, these RDP protocol extensions do not allow local windows to be placed between remote windows belonging to the same user session, in terms of z-order. This behavior has undesirable implications, for example, a remote desktop session contains both word-processing and spreadsheet applications while a web browser is running locally. The browser is the foreground application, and therefore the browser window overlays both the word-processor and spreadsheet application windows. The user clicks the word-processor window in order to bring it to the foreground in order to compare to text in the browser. However, because both the word-processor and spreadsheet are displayed within the same local window, they are both brought forward and the spreadsheet overlays and obscures the browser. This behavior is totally different than that of local applications, and not at all what the user wanted or expected.

There is thus a need for, and it would be highly advantageous to have a method which provides a seamless windows feature for protocols that transmit the remote desktop as a unit, such as current versions of RDP, so that remote windows properly emulate the behavior of local windows regarding windows z-order in the local desktop.

Z-order is an ordering of overlapping two-dimensional objects, such as windows in a graphical user interface (GUI) or shapes in a vector graphics editor. One of the features of a typical GUI is that windows may overlap, so that one window hides part or all of another. When two windows overlap, their z-order determines which one appears on top of the other.

The term "z-order" as used herein refers to the order of windows in a graphical user interface (GUI) along the Z-axis, with the windows in the GUI being a series of planes parallel to the surface of the monitor. The windows are therefore stacked along the Z-axis, and the z-order information thus specifies the front-to-back ordering of the windows on the screen.

The term windows "z-order index" as used herein is an index value that determines which windows lay on top of other windows when they overlap. Windows that have a lower z-order index value obscure windows that have a higher index value. Consequently, windows with a lower z-order index value are said to be in front, or foreground. Windows with a higher z-order value are said to be in the back or background. The user can bring windows to the foreground or send them to the background by interacting with them. For example, in Microsoft Windows, when a user clicks on a window, the default behavior is to bring this window to the foreground.

The terms "client", "client node" and "client device" are used herein interchangeably. The term "atomic" as used herein refers to a process in which either the process is performed to completion, or none of the steps of the process are performed. The term "topmost" is used herein refers to a window which has the lowest z-order index and appears in front of all other windows.

SUMMARY OF THE INVENTION

According to the present invention there is provided a method in a client-server system. A server-node application runs a user session, and a remote presentation protocol communicates between a client node and the server node. The server node stores a remote virtual desk-top including remote windows of the user session. The client node displays multiple local windows of applications running locally on the client node and further displays one or more windows of the remote virtual desktop. The one or more windows are clipped to produce a clipped region so that the remote windows are displayed therein to appear as the local windows. The local windows are enumerated and an area of each local window which overlaps the clipped region is subtracted from the clipped region so that the local windows show through the area. Preferably, the enumeration is performed according to z-order from back to front. Preferably, local stub windows are provided for the remote windows and a z-order index of the local stub windows is set to match the z-order index of said at least one remote window. When one of the local windows is a stub window, associated with one of the remote windows, the area of the one associated remote window is added to the clipped region. When a remote window is owned by the one associated remote window, the area of the owned remote window is preferably added to the clipped region. When the enumeration is performed as an atomic operation, respective handles of the local windows are preferably copied into a data structure.

The clipped region is preferably re-calculated by enumeration over the local windows when intercepting local window events. A notification is sent from the server-node application of an event regarding one of the remote windows; and upon receiving the notification, the clipped region is preferably recalculated by performing the enumeration. When the notification regards one of the remote windows being a topmost remote window, the one or more windows displaying the remote virtual desktop is made topmost.

According to the present invention, there is provided a program storage device readable by a machine, tangibly embodying a program of instructions executable by the machine to perform a method in a client-server system wherein the client server system includes a server node application running a user session, wherein a remote presentation protocol communicates between a client node and the server node, wherein the server node stores a remote virtual desktop including a multiple remote windows of the user session, the method as disclosed herein.

According to the present invention there is provided a client-server system including a server-node application component which runs a user session, wherein a remote presentation protocol communicates between a client node and the server node. The server node stores a remote virtual desktop including a remote windows of the user session. A client-node application component which runs on the client node displays local windows of applications running locally on the client node and displays one or more windows of the remote virtual desktop. A portion of the one or more windows is clipped, thereby producing a clipped region, so that the one or more windows appear as the local windows. The client-node application component enumerates over the local windows and subtracts from the clipped region an area of each said local window overlapping the clipped region. Preferably, the remote presentation protocol is Microsoft Remote Desktop Protocol (RDP and the server nodes are Microsoft Terminal Servers. Preferably, the server-node component transmits status information to the client node application component, and the status information is related to remote windows running in the user session.

BRIEF DESCRIPTION OF THE DRAWINGS

The invention is herein described, by way of example only, with reference to the accompanying drawings, wherein.

DESCRIPTION OF THE PREFERRED EMBODIMENTS

Figure 1:
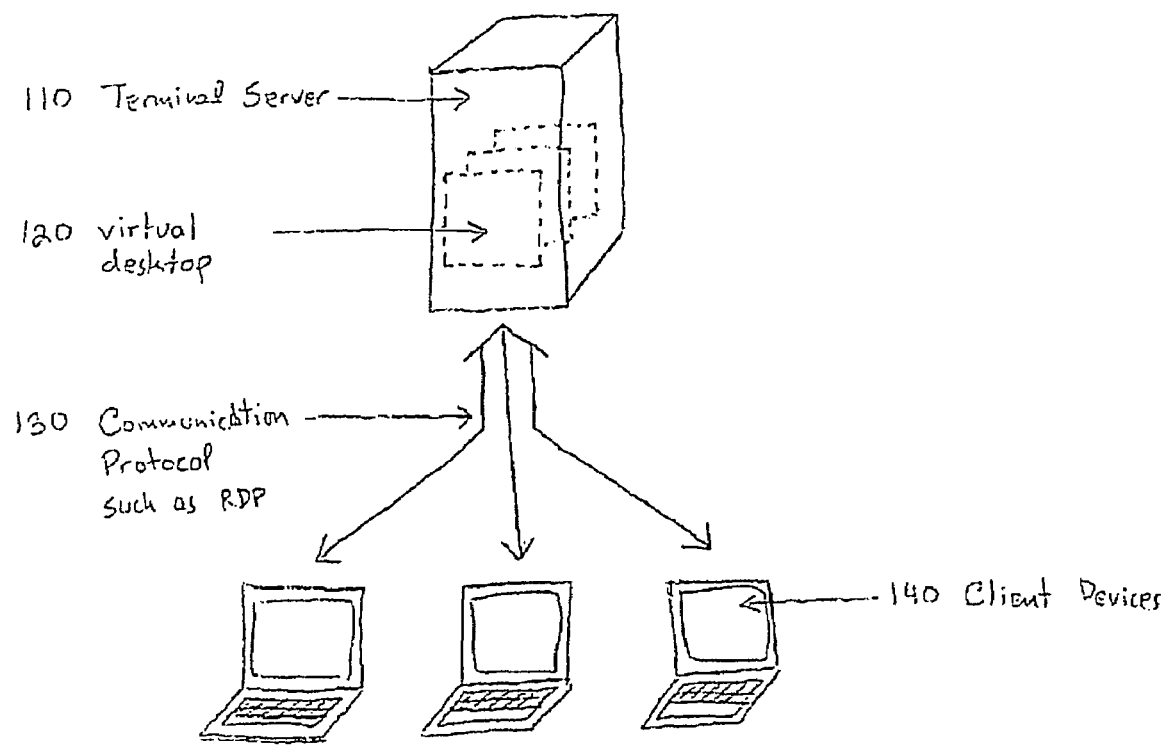
FIG. 1 (prior art) is a diagram of a server-based computing system running a communication protocol such as RDP between the server and client nodes.
Figure 2:
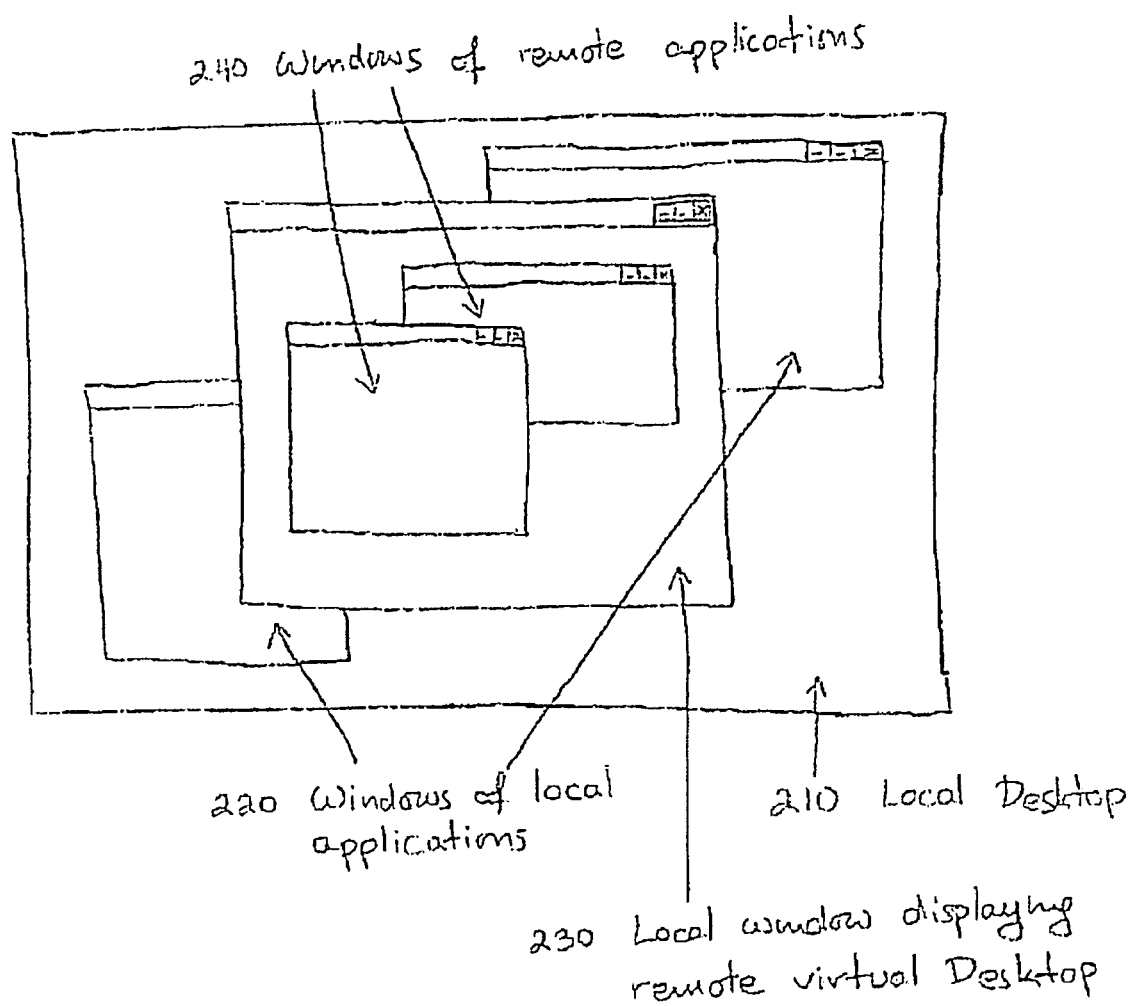
FIG. 2 (prior art) is a schematic drawing of the remote desktop being displayed in a window on the local desktop.

The present invention is of a system and method of providing seamless windows functionality in a hybrid client/server network. Specifically, in the system and method application windows running on the server node emulate z-order of application windows running on the and client node The principles and operation of a system and method providing seamless windows functionality, according to the present invention, may be better understood with reference to the drawings and the accompanying description.

Before explaining embodiments of the invention in detail, it is to be understood that the invention is not limited in its application to the details of design and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

For any windowing environment that features overlapping windows, the behavior of a window regarding operations that bring it to foreground or send it to the background, is a crucial aspect of its look and feel. Thus properly emulating z-order behavior is required in order to achieve complete seamless windows functionality.

In one aspect, embodiments of the present invention feature a method that modifies the clipped region of window (230) displaying remote virtual desktop (120) so that Window (230) appears to be fully integrated into the local desktop regarding window z-order. Sections of the remote desktop that should be obscured by local windows are clipped so that the local windows show though.

In another aspect of embodiments of the present invention, the clipped region is updated dynamically so that when either local or remote windows change their z-order position, their screen coordinates or size, the appearance of integration is maintained. This update is performed sufficiently quickly so that the user doesn't notice, or hardly notices any differences of behavior from a desktop containing only local windows.

In still another aspect of embodiments of the present invention, special handling is performed for topmost remote windows, so that the user can locate and utilize them conveniently. This is done by making topmost remote windows locally topmost.

Implementation of the method and system of the present invention involves performing or completing selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

Figure 3:
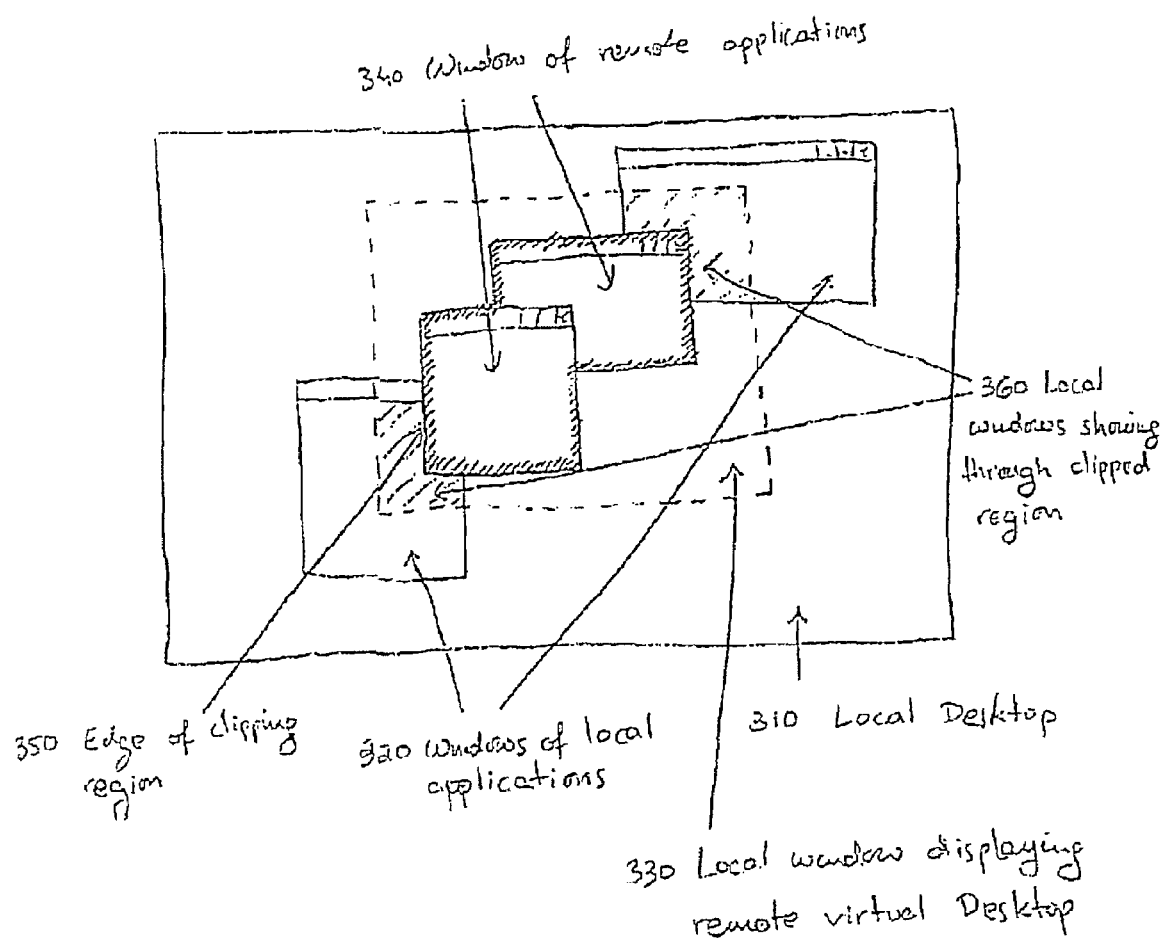
FIG. 3 is a schematic drawing showing how the window containing the remote desktop is clipped so that windows displayed within it appear to be integrated into the local desktop.

Reference is now made to FIG. 3, a drawing of local desktop (310) according to an embodiment of the present invention. Local desktop (310) includes a local window (330) displaying remote virtual desktop (120). In order to achieve seamless windows functionality, attributes of local window (330) are modified. Typically, only the client area of local window (330) is displayed. The client area is a portion of window (330) containing the windows (340). Other portions of window (330), such as titlebar, borders, menus, status line, or scrollbars, are not displayed. Further, client area of window (330) is clipped at edges (350) of remote windows (340) so that sections of window (330) that do not show images of remote windows (340) are not displayed. Instead local windows (320) that are underneath window (330) but not under remote windows (340) are displayed. Window (330) is preferably configured not to have a taskbar icon so that window (330) does not appear as a distinct entity on local desktop (310). Clipping the client area of local window (330) is performed based on size and position values of remote windows (340), by mapping to coordinates of local desktop (310).

Coordinate information of remote windows (340) is sent from a special application component running on server (110) hosting the remote user session. For the RDP protocol, it is most appropriate to send this information through one or more virtual channels within the RDP connection (RDP is based on, and an extension of the ITU T.120 family of protocols, which means that it is a capable of multiple channels). The window information sent from terminal server (110) includes:

Notifications about window (340) creation and destruction
  Notifications about windows (340) being shown or hidden (made invisible)
  Notifications about window (340) size change, including new size and minimize/maximize state
  Notifications about window (340) position change, including new position
  Notifications about window (340) activation—window (340) being brought to foreground and receiving keyboard focus.
  Notifications about owner window of window (340) including an identifier of the owner window. Ownership is a one-to-many relationship between windows. Ownership is defined by some operating systems and windowing frameworks: A window can have one owner or none, but the window can own multiple windows. Also, an owned window can also own other windows. Being owned places several constraints on a window: An owned window is always above its owner in the z-order. The system automatically destroys an owned window when its owner is destroyed. An owned window is hidden when its owner is minimized. In the context of embodiments of the present invention, ownership is required in order to determine the z-order index of the owned windows.

On the client (140) side, the remote window information sent from terminal server (110) and received by clients (140) regarding remote windows' (340) attributes is stored and used to calculate, or recalculate, the clipped region for the local window (330) displaying the remote desktop whenever updated information is received. In some cases it may be possible to determine that the update will not affect the clip region, and therefore the clip region is not be recalculated.

According to a feature of embodiments of the present invention, remote windows in remote virtual desktop (120) are assigned local stub windows, i.e. local windows (340) that have a taskbar icon but no other visible representation. In this way, the remote windows that have a virtual taskbar icon in remote virtual desktop (120) are assigned a taskbar icon on local desktop (310) via the local stub window. When the taskbar icon of the local stub window is activated, the activation is directed to display local window (330) displaying remote desktop (120). In addition, the activation causes a message to be sent to server (120) so that the remote window associated with the activated local stub window is brought to the foreground of remote virtual desktop (120). Following this operation the local window (330) displaying remote desktop (120) is the foreground window of local desktop (310), with the stub window right behind it. This means that the relative z-order of the stub windows on local desktop (310) matches the z-order position of the remote windows on the remote virtual desktop (120).

The method described above results in a user perception that the remote windows are an integral part of the local desktop (310). This perception can be broken, however, by the inconsistency between the behavior of local and remote seamless windows regarding windows z-order: because all windows (340) are contained within a single local window (330), all the remote windows have the same relative position as in corresponding local windows (340).

Figure 4:
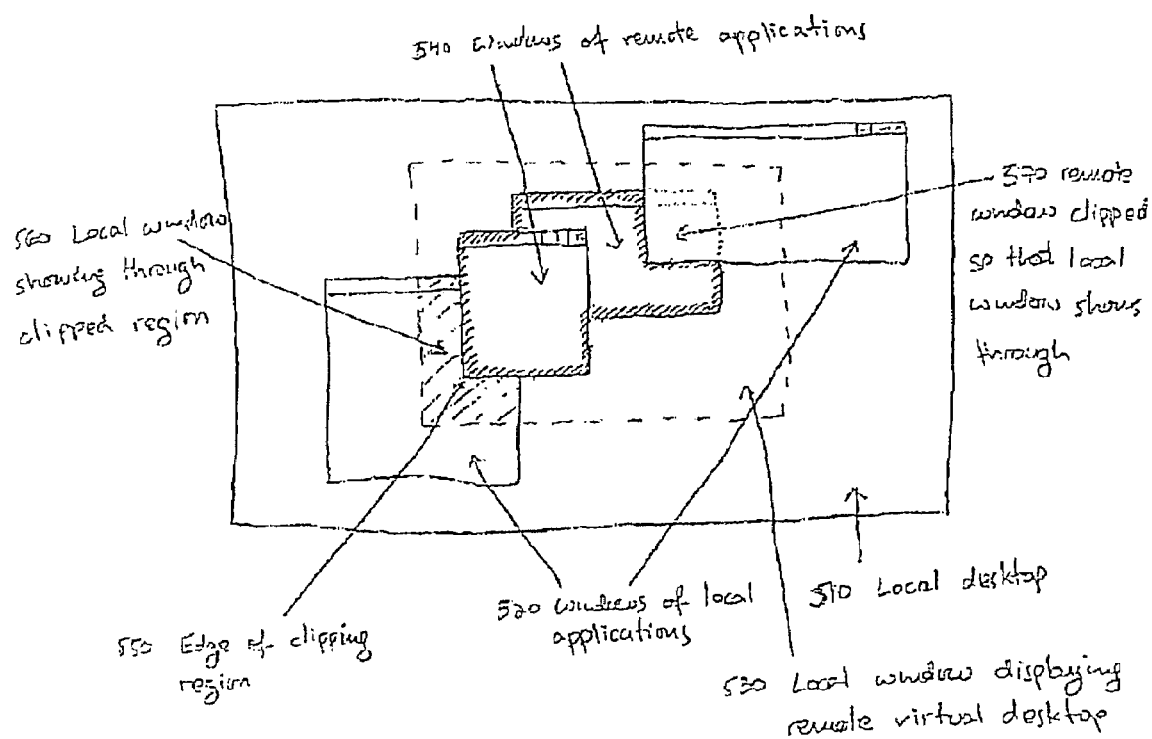
FIG. 4 is a schematic drawing illustrating clipping of remote desktop so that remote windows appear to be integrated into local desktop with the appropriate z-order index.

Reference in now made to FIG. 4, a drawing of a local desktop (510) according to an embodiment of the present invention. Clipped region of local window (530) displaying the remote desktop is calculated in such a way that local Windows (520) that should appear above a specific remote window (540) appear to overlay it even though, based on their z-order index in virtual desktop (120), the corresponding local windows (520) are actually underneath the local window (530) hosting the remote desktop. In area (570) remote window (540) is clipped so that window (520) shows through. In area 560, window (540) of remote application, shows through the clipped region of local window (530).

In order to calculate the clip region as described above, the following operation is performed every time the clip region needs to be updated:

1. The local windows are enumerated bottom (background) to top (foreground) in the z-order.
2. Initially the clip region is empty.
3. For every stub window encountered, the area of its associated remote window (540R), mapped to the local desktop and is added to the clip region.
4. All remote windows 540OR owned by remote window 540R are added to the clip region. This operation is performed recursively, as remote windows 540OR may own other remote windows (540OOR).
5. For each local window 520L, its area is subtracted from the clip region.
6. All local windows 520OL, owned by local window 520L are subtracted from the clip region. This operation is performed recursively, as local windows 520OL may own other local windows 520OOL.
7. The local window (530) displaying the remote desktop is excluded from the clip region calculation.

On some operating systems it is only possible to enumerate the local windows (520) bottom to top as an atomic operation. In such cases, the windows are enumerated top to bottom, while copying their handles into a data structure. The contents of the data structure are then enumerated in a reverse order. Because modifying a clip region may be an expensive computational operation, an optimization is preferred according to an embodiment of the present invention, in which the handles are copied into the data structure only starting with the first stub window encountered. As a result, the calculation excludes local windows (520A) that are above the first stub while enumerating. Because these local windows (520A) are also above local window (530) displaying the remote desktop, excluding them has no effect on the overall desktop display. Another optimization is to ignore all local windows 520 in the data structure until the bottom most stub window is encountered. Because the clip region is empty until the first stub is encountered, subtracting the areas of these windows 520 would have no effect in any event.

According to an aspect of the present invention, a local application component installed on client (140) intercepts local window events, such as window creation, deletion and position or size changes. Whenever such an event occurs, the clip region is recalculated. This allows the clip region of the local window (530) displaying the remote desktop to remain accurate even in the uncommon event of windows (520) changing size or location even if they are not in the foreground.

In an aspect of this embodiment, windows of applications that are already running in the remote client sessions before client (140) connects to server (110) are also properly integrated into the clip region. Such a scenario can occur, for example when client (140) becomes disconnected from server (110) because of network problems. Server (110) can be configured to retain the user session for a specified duration. If client (140) manages to resume the connection to server (110) during that period, the session is resumed, with all the running applications intact. In order to take the client windows of already running applications into account when calculating the clip region, the information for these windows needs to be sent at connection time to the server (110). This information can either be sent using a specialized reconnection message, or by sending messages that simulate the creation of the windows in the appropriate order.

In another embodiment of the present invention, special processing is applied to remote windows that are topmost on the remote virtual desktop. Topmost windows are windows that are above all non topmost windows even when they are deactivated and lose focus. Such windows are often used as notifications for important events that users need to respond to, or be made aware of, even if the application which generated the notification is not in the foreground. For remote windows to properly integrate into the local desktop, and retain their functionality, remote topmost windows need to be made accessible as topmost windows on the local desktop.

In an aspect of this embodiment, an application component running on server (110) hosting the remote virtual sessions, sends notifications to client (140) about a remote window (540) becoming topmost or non-topmost. The client (140) software then uses this information to alter its behavior accordingly.

In a particular aspect of this embodiment, local window (530) hosting the remote desktop becomes topmost on the local desktop whenever, and for as long as any of remote windows (540) on the remote desktop is topmost. When local window (530) displaying the remote desktop is made topmost, or non topmost, its clip region is recalculated to properly integrate the remote windows in the z-order of the local desktop, as previously described.

While the invention has been described with respect to a limited number of embodiments, it will be appreciated that many variations, modifications and other applications of the invention may be made.

What is claimed is:

1. In a client-server system, a method comprising the steps of:
    (a) providing a server-node application running a user session, wherein a remote presentation protocol communicates between a client node and said server node wherein said server node stores a remote virtual desktop including a plurality of remote windows of said user session;
    (b) displaying on said client node a plurality of local windows of applications running locally on said client node and displaying in at least one local window said remote virtual desktop, wherein at least one of said local windows is a local stub window and wherein said each local stub window is associated with one of said remote windows;
    (c) performing a clipping procedure on at least a portion of said at least one local window displaying said remote virtual desktop, said clipping procedure involving a mathematical operation which removes said at least one portion from said at least one local window to provide a clipped region, so that said remote windows are displayed therein to appear as said local widows;
    (d) enumerating over said local windows and subtracting from said clipped region an area of each local window overlapping said clipped region, whereby said local windows show through said area, and (e) adding to said clipped region the area of at least one said remote window associated with a respective stub window.

2. The method, according to claim 1, wherein said enumerating is performed according to z-order from back to front.

3. The method, according to claim 1, wherein said enumerating is performed as an atomic operation, further comprising the step of (f) copying a plurality of respective handles of the local windows into a data structure.

4. The method, according to claim 1, further comprising the step of:

(f) recalculating said clipped region by performing said enumerating upon intercepting local window events.

5. The method, according to claim 1, further comprising the steps of:

(f) sending a notification from said server-node application of an event regarding one of said remote windows; and (g) upon said receiving said notification, recalculating said clipped region by performing said enumerating.

6. The method, according to claim 2, further comprising the steps of:

(f) providing said local stub window and (g) setting a z-order index of said local stub window to match a z-order index of said associated remote window.

7. The method, according to claim 5, wherein said notification regards one of said remote windows being a topmost remote window, further comprising the step of:

(h) making said at least one window topmost.

8. A program storage device readable by a machine, tangibly embodying a program of instructions executable by the machine to perform a method in a client-server system wherein the client server system includes a server node application running a user session, wherein a remote presentation protocol communicates between a client node and said server node, wherein said server node stores a remote virtual desktop including a plurality of remote windows of said user session, the method comprising the steps of:

(a) displaying on said client node a plurality of local windows of applications running locally on said client node and displaying said remote virtual desktop as at least one local window wherein one of said local windows is a local stub window and wherein said local stub window is associated with one of said remote windows;

(b) performing a clipping procedure on at least a portion of said at least one local window displaying said remote virtual desktop, said clipping procedure involving a mathematical operation which removes said at least one portion from said at least one local window to provide a clipped region, so that said remote windows are displayed therein to appear as said local windows;

(c) enumerating over said local windows and subtracting from said clipped region an area of each said local window overlapping said clipped region, and (d) adding to said clipped region the area of said remote window associated with said stub window.

9. The program storage device, according to claim 8, wherein said enumerating is performed according to z-order from back to front.

10. The program storage device according to claim 8, wherein said enumerating is performed as an atomic operation, further comprising the step of:

(e) copying a plurality of respective handles of the local windows into a data structure.

11. The program storage device, according to claim 8, wherein the method further comprises the step of (e) recalculating said clipped region by performing said enumerating upon intercepting local window events.

12. The program storage device, according to claim 8, wherein the method further comprises the steps of:

(e) sending a notification from said server-node application of an event regarding one of said remote windows; and (f) upon said receiving said notification, recalculating said clipped region by performing said enumerating.

13. The program storage device, according to claim 9, wherein the method further comprises the steps of:

(e) providing said local stub window and (f) setting a z-order index of said local stub window to match a z-order index of said associated remote window.

14. The program storage device, according to claim 12, wherein said notification regards one of said remote windows being a topmost remote window, and wherein the method further comprises the step of:

(g) making said at least one window topmost.

\* \* \* \* \*